(12) United States Patent  
Cote

(10) Patent No.: US 6,931,780 B2  
(45) Date of Patent: Aug. 23, 2005

(54) FISHING LURE RECUPERATOR

(76) Inventor: Jean-Yves Cote, 105, St-Simon, Ste-Madeleine, Quebec (CA), J0H 1S0

( * ) Notice: Subject to any disclaimer, the term of this patent is extended or adjusted under 35 U.S.C. 154(b) by 39 days.

(21) Appl. No.: 10/833,590

(22) Filed: Apr. 28, 2004

(65) Prior Publication Data

US 2004/0211107 A1 Oct. 28, 2004

Related U.S. Application Data

(60) Provisional application No. 60/465,515, filed on Apr. 28, 2003.

(51) Int. Cl.[7] ............................................. A01K 97/24
(52) U.S. Cl. ..................................................... 43/17.2
(58) Field of Search ........................... 43/17.2; 119/792, 119/795, 797, 856, 863

(56) References Cited

U.S. PATENT DOCUMENTS

| | | | | | |
|---|---|---|---|---|---|
| 1,044,792 | A | * | 11/1912 | Levy | 43/17.2 |
| 1,988,160 | A | * | 1/1935 | Butte | 43/17.2 |
| 2,074,057 | A | * | 3/1937 | Kempe | 43/17.2 |
| 2,187,021 | A | * | 1/1940 | Everson | 119/792 |
| D148,809 | S | * | 2/1948 | McDonald, Jr. | 43/17.2 |
| 2,453,245 | A | * | 11/1948 | McDonald, Jr. | 43/17.2 |
| 2,481,975 | A | * | 9/1949 | Brooks | 43/17.2 |
| 2,482,716 | A | * | 9/1949 | Noelcke | 43/17.2 |
| 2,586,073 | A | * | 2/1952 | McKee | 43/17.2 |
| 2,597,229 | A | * | 5/1952 | Cox | 43/17.2 |
| 2,712,706 | A | * | 7/1955 | Gendron | 43/17.2 |
| 2,722,077 | A | * | 11/1955 | Newman | 43/17.2 |
| 2,779,120 | A | * | 1/1957 | Moore | 43/17.2 |
| 2,827,017 | A | * | 3/1958 | Ryan | 119/795 |
| 2,828,570 | A | * | 4/1958 | Bradbury | 43/17.2 |
| 2,861,377 | A | * | 11/1958 | Childress | 43/17.2 |
| 2,926,449 | A | * | 3/1960 | Louis | 43/17.2 |
| 2,940,203 | A | * | 6/1960 | Carter | 43/17.2 |
| 3,176,425 | A | * | 4/1965 | Mudd | 43/17.2 |

(Continued)

FOREIGN PATENT DOCUMENTS

| | | | | |
|---|---|---|---|---|
| DE | 3904414 | A1 | * | 8/1990 |
| DE | 29800932 | U1 | * | 4/1998 |
| DE | 19954744 | A1 | * | 5/2001 |
| EP | 1240825 | A1 | * | 9/2002 |
| GB | 168186 | A1 | * | 9/1921 | 43/17.2 |
| GB | 2369762 | A1 | * | 6/2002 |
| IT | 432772 | B1 | * | 3/1948 | 43/17.2 |
| JP | 2001-169707 | B1 | * | 6/2001 |
| JP | 2001-292678 | B1 | * | 10/2001 |
| JP | 2002-272340 | B1 | * | 9/2002 |
| WO | WO-98/54959 | A1 | * | 12/1998 |

*Primary Examiner*—Darren W. Ark

(57) ABSTRACT

A fishing lure recuperator comprised of a looped piece attached to a connector itself attached to a cord and which is slid down a fishing line in order to grab hold of a stuck fishing lure and pulling it up to the surface.

8 Claims, 3 Drawing Sheets

U.S. PATENT DOCUMENTS

Figure 1:
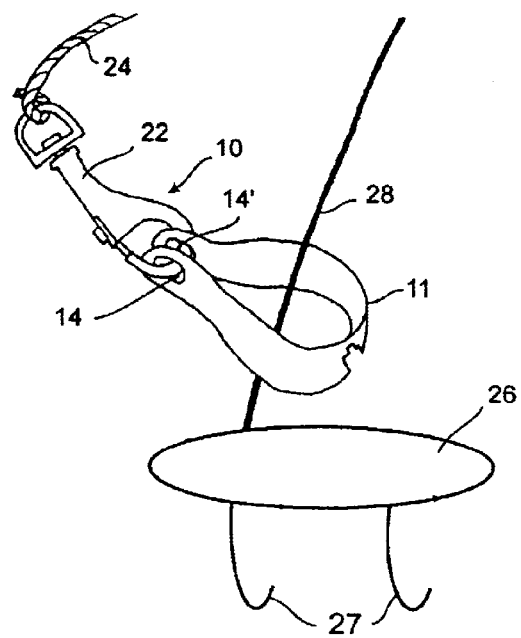

| | | | | |
|---|---|---|---|---|
| 3,216,143 A | * | 11/1965 | Seldon | 43/17.2 |
| 3,243,911 A | * | 4/1966 | Splawinski | 43/17.2 |
| 3,246,415 A | * | 4/1966 | Forbes | 43/17.2 |
| 3,360,292 A | * | 12/1967 | Trammell | 43/17.2 |
| 3,364,611 A | * | 1/1968 | Downing | 43/17.2 |
| 3,464,138 A | * | 9/1969 | Lindner | 43/17.2 |
| 3,512,292 A | * | 5/1970 | Splawinski | 43/17.2 |
| 3,531,887 A | * | 10/1970 | Bortle | 43/17.2 |
| 3,550,303 A | | 12/1970 | Western | |
| 3,574,967 A | * | 4/1971 | Splawinski | 43/17.2 |
| 3,623,258 A | | 11/1971 | Doane | |
| 3,688,429 A | * | 9/1972 | Mauck | 43/17.2 |
| 3,693,277 A | * | 9/1972 | Wells | 43/17.2 |
| 3,772,815 A | * | 11/1973 | Burgess | 43/17.2 |
| 3,792,545 A | * | 2/1974 | Hendrickson | 43/17.2 |
| 3,987,573 A | | 10/1976 | Clayton | |
| 4,145,832 A | * | 3/1979 | Knight, Jr. | 43/17.2 |
| 4,155,190 A | * | 5/1979 | McInturff et al. | 43/17.2 |
| 4,301,610 A | * | 11/1981 | Brown | 43/17.2 |
| 4,467,547 A | * | 8/1984 | Chabot | 43/17.2 |
| 4,524,536 A | * | 6/1985 | Eckerson | 43/17.2 |
| 4,712,324 A | * | 12/1987 | Padgett | 43/17.2 |
| 5,081,784 A | * | 1/1992 | Santucci et al. | 43/17.2 |
| 5,157,856 A | * | 10/1992 | Packer | 43/17.2 |
| 5,485,696 A | * | 1/1996 | Barton | 43/17.2 |
| 5,946,844 A | * | 9/1999 | Stoliar et al. | 43/17.2 |
| 5,967,095 A | * | 10/1999 | Greves | 119/795 |
| 6,092,326 A | * | 7/2000 | Strome | 43/17.2 |
| 6,305,119 B1 | * | 10/2001 | Kacak | 43/17.2 |
| 6,371,056 B1 | * | 4/2002 | Phillips | 119/797 |
| 6,442,886 B1 | | 9/2002 | McAfee et al. | |
| 6,463,692 B1 | * | 10/2002 | Johnsen | 43/17.2 |
| 2002/0073936 A1 | * | 6/2002 | Fields-Babineau | 119/863 |
| 2004/0069241 A1 | * | 4/2004 | Falwell | 119/795 |

\* cited by examiner

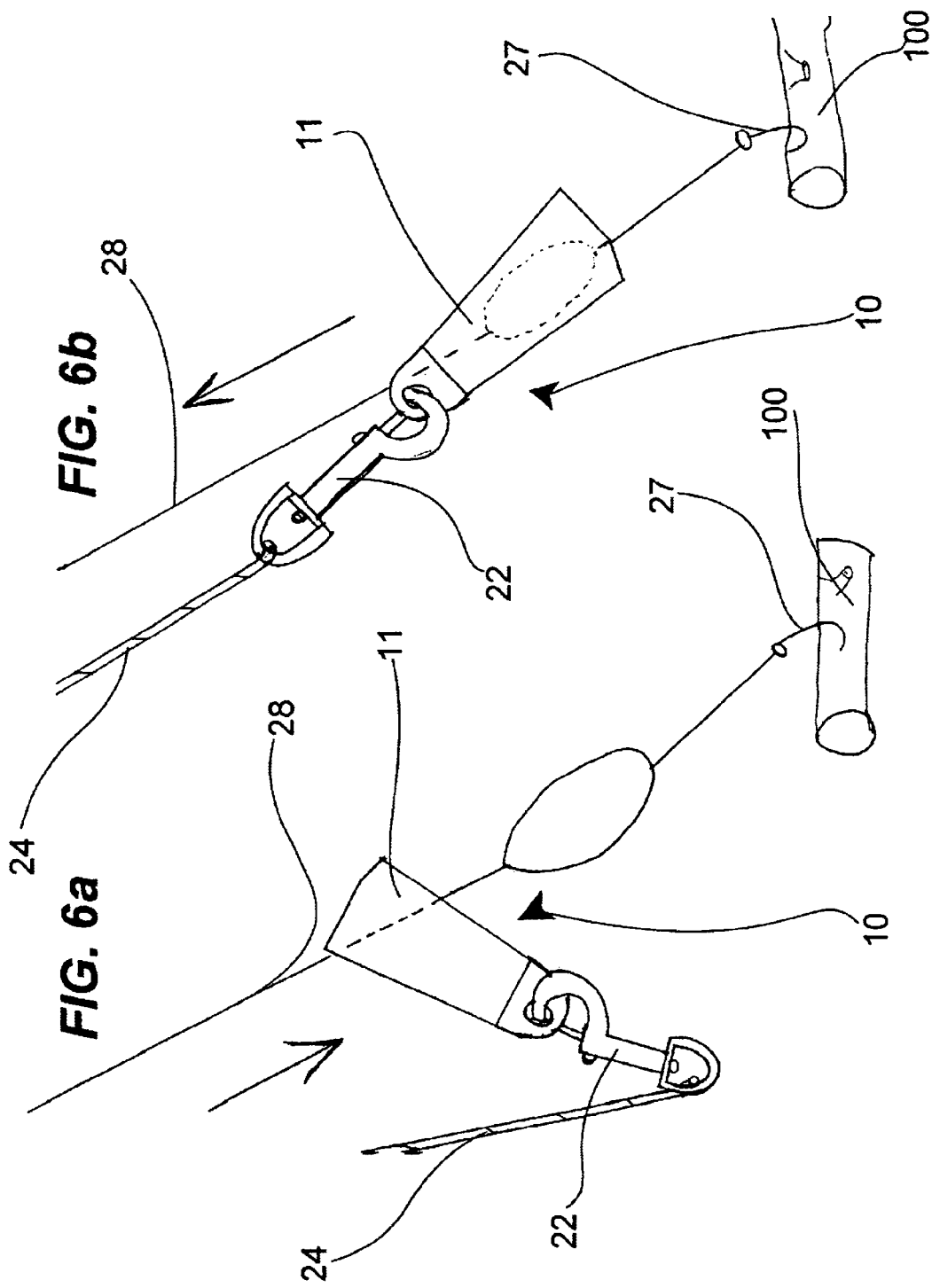

FISHING LURE RECUPERATOR

This application claims priority based on provisional application 60/465,515 filed Apr. 28, 2003

BACKGROUND OF THE INVENTION

1. Field of the Invention

This invention relates generally to fishing lines and lures but more particularly to a device which recuperates fishing lures that are stuck underwater.

2. Background

Losing one's lure has been the bane of many fishermen over the years. Since some types of lures are rather expensive, it is sometimes distressing to have to cut one's fishing line because a lure got caught in some underwater log or other debris or vegetation. Sometimes the water is too deep or too cold or both to be able to conveniently get to the lure and unstuck it. There is therefore a need for a practical way of freeing a stuck fishing lure.

SUMMARY OF THE INVENTION

It is a main feature of this invention to provide for an inexpensive, practical and efficient way to free a fishing lure that is stuck underwater.

In order to do so, the invention uses some basic readily available components which are used to attach the fishing lure recuperator. The fishing lure recuperator is bent to form a loose noose around the fishing line and is retained in this noose configuration by a connector which is itself attached to a thin rope or twine. As long as the connector is made of metal, it will sink and drag the fishing lure recuperator with it. Once the fishing line recuperator has reached the lure, actually a spot just below it, the fishing lure recuperator will engage an insertion slot which funnels into a small grabber incision sized for a fishing line. In grabbing a hold of the fishing line in that way, it is possible to unstuck a fishing lure even if it often results in breaking the fishing line below the lure and losing the hook. At least, the lure and most of the fishing line is saved when otherwise, a strong pull could snap the line at any point between the reel and the hook, which is especially distressing when it is close to the reel and most of the line is lost which remains in the water and can snare ducks and other water borne birds as well as mammals swimmers and divers as well as motor boat propellers.

The foregoing and other objects, features, and advantages of this invention will become more readily apparent from the following detailed description of a preferred embodiment with reference to the accompanying drawings, wherein the preferred embodiment of the invention is shown and described, by way of examples. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE PREFERRED EMBODIMENT

FIG. 1 Perspective view of the invention in context.

Figure 2:
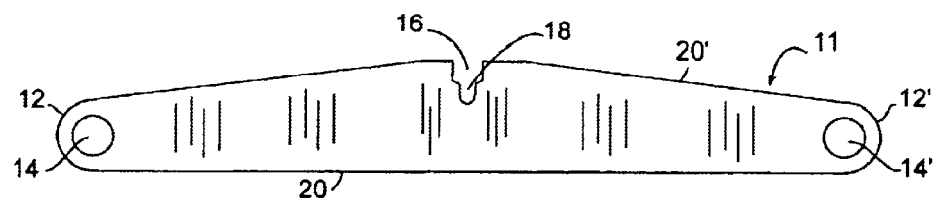

FIG. 2 Front elevation of the fishing lure recuperator opened and flattened.

Figure 3:
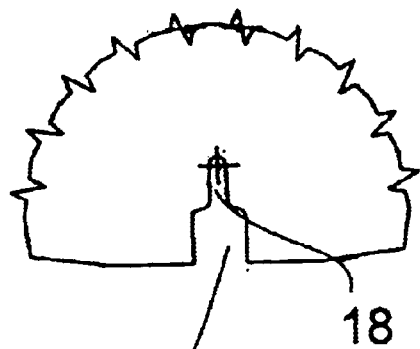

FIG. 3 Front elevation detail of the area around the insertion slot.

Figure 4:
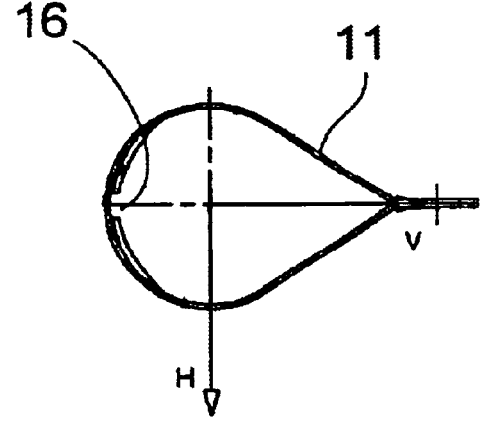

FIG. 4 Top elevation of the fishing lure recuperator.

Figure 5:
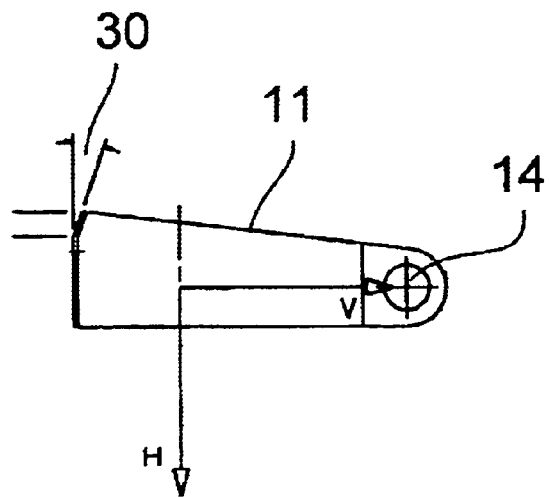

FIG. 5 Side elevation of the fishing lure recuperator.

FIGS. 6ab Perspective views showing the mode of operation.

DETAILED DESCRIPTION OF THE PREFERRED EMBODIMENT

A fishing lure recuperator (10) comprises a looped piece (11) (shown flattened in FIG. 2) having a length a width and two opposite ends (12 and 12'), and each opposite ends has a hole (14, 14'). Halfway along the length of the looped piece (11) is an insertion slot (16) which funnels into a small grabber incision (18) sized for a fishing line (28).

Along the length of the looped piece (11) are two sides (20, 20') which are not parallel, rather, the side (20') where the insertion slot (16) is to be found is gabled so that it forms a generally triangular shape wherein the apex of the gable is where the insertion slot (16) is located.

Besides the looped piece (11), a string or cord (24) is used for pulling on the looped piece from the surface. A connector means (22) releasably connects the string or cord (24) to the looped piece (11). The connector means (22) releasably connects through both holes (14, 14') of the looped piece (11) wherein which both holes (14, 14') stand relatively mated. The connector means (22) itself is fixedly attached to a cord (24) by way of a knot although any other attachment means, whether permanent or semi-permanent, can be used without departing from the scope of the invention. It should be understood that although the cord (24) and the connector means (22) are essential to the workings of the lure recuperator (10) and that they could be bought as part of a kit, the looped piece (10) itself is the key element and that the connector means can come in a variety of ways besides a bolt snap as shown in the figures without departing from the spirit of the invention. It is important that the lure recuperator (10) be able to sink and therefore a non buoyant object is preferred for the connector means (22) so that the lure recuperator (10) can sink as quickly as possible. Of course any additional non buoyant object, such as lead weight well known to fishermen, can be attached to the cord (24) to make it sink faster. The looped piece is generally made of metal that is not affected by water such as stainless steel but any other non buoyant material offering the strength and surability required is satisfactory.

A user finding his lure caught in some underwater object (100) such as a log or branch or other vegetation or impediment uses the lure recuperator (10) by wrapping it around the fishing line (28), installing the connector means (22) with the cord (24) attached and drops it so that the lure recuperator (10) slides along the fishing line as per FIG. 6a. Once the lure recuperator (10) has reached a spot just below the stuck fishing lure (26), the user pulls lightly on the cord (24) so that the insertion slot (16) guides the small grabber incision (18) into seizing the lure (26), as per FIG. 6b. Moreover, an angle (30) of between 9 to 25 degrees, formed within the bend of the looped piece (11) creates a shape which further contributes to maintaining the lure (26) within the grasp of the looped piece (11) during the critical moment that strong tension is put on the fishing line (28) which can eventually result in snapping the fishing line (28). This results in freeing the lure (26) which is then brought back to the surface by winding in the fishing line (28).

What is claimed is:

1. A fishing lure recuperator comprising:

a looped piece having a length, a width, and two opposed ends;

each of said opposed ends having a hole;

said looped piece having two sides along the length thereof;

one of said sides forming a generally triangular shape;

an insertion slot at an apex of said triangular shape situated generally halfway along the length of said looped piece;

said insertion slot funneling into a small grabber incision sized for engaging onto a fishing line while being able to hold and contain a fishing lure;

a connector means releasably connected to the looped piece by way of said holes.

2. A fishing lure recuperator as in claim 1 wherein: said connector means being a bolt snap.

3. A fishing lure recuperator as in claim 1 wherein: an angle formed within the looped piece contributes to maintaining said fishing lure within the hold of said looped piece.

4. A fishing lure recuperator as in claim 3 wherein: said angle being between 9 to 25 degrees.

5. A fishing lure recuperator as in claim 1 wherein: said looped piece being made of non buoyant material.

6. A fishing lure recuperator as in claim 5 wherein: said looped piece being made of metal.

7. A fishing lure recuperator as in claim 6 wherein: said looped piece being made of stainless steel.

8. A fishing lure recuperator as in claim 1 wherein:

said two sides along the length of said looped piece not being parallel to each other.

* * * * *